Nov. 2, 1965
H. C. LIKEL
3,215,946
SERIES ENERGIZED TRANSISTORIZED CIRCUIT FOR AMPLIFYING AND INVERTING POLAR INPUT SIGNALS
Filed Feb. 7, 1962
2 Sheets-Sheet 1

INVENTOR.
H. C. LIKEL
BY J. B. Burke
ATTORNEY

Nov. 2, 1965 H. C. LIKEL 3,215,946

SERIES ENERGIZED TRANSISTORIZED CIRCUIT FOR AMPLIFYING AND INVERTING POLAR INPUT SIGNALS

Filed Feb. 7, 1962 2 Sheets-Sheet 2

INVENTOR.
H. C. LIKEL

BY J. B. Burke

ATTORNEY

United States Patent Office 3,215,946
Patented Nov. 2, 1965

3,215,946

SERIES ENERGIZED TRANSISTORIZED CIRCUIT FOR AMPLIFYING AND INVERTING POLAR INPUT SIGNALS

Harry C. Likel, Brooklyn, N.Y., assignor to The Western Union Telegraph Company, New York, N.Y., a corporation of New York Filed Feb. 7, 1962, Ser. No. 171,650
2 Claims. (Cl. 330—18)

This invention concerns a transistorized tranmitter for polar signals in telegraphy.

Polarized relays have been used heretofore for transmission of polar signals. High quality relays of this type are somewhat costly and require maintenance attention to keep them operating properly. The present invention avoids the use of such relays and provides instead a transistorized repeating circuit which is capable at operation at higher speeds, with less initial cost and with less subsequent maintenance cost than prior electromagnetic and electromechanical circuits and devices intended for transmitting polar signals.

The present invention is adapted for use as an amplifier for high speed polar signals. It can serve to recoup losses in line circuits and equipment. The present invention may serve as an adapter for repeating polar signals from one device into another whose input is adapted to operate at higher voltage or current. The invention may be used in receivers for carrier telegraph or data channels as an amplifying device to raise the output levels from relatively low power output of carrier detectors or discriminators to higher levels needed for operation of telegraph relays, printers or other utilization equipment.

The invention is adapted for effecting inversion of polar signals in a repeater so that low voltage or current polar signals of one polarity applied at the input will result in polar signals of opposite polarity at high voltage or current.

It is therefore a principal object of the invention to provide a transistorized circuit for transmitting polar signals, the circuit being adapted for operation between an input of low current or voltage and an output of much higher current or voltage, at speeds higher than can be accommodated by conventional relays.

A further object is to provide a transistorized repeater amplifier for polar signals wherein a low voltage input signal is applied to a first transistor and high output voltage signals are derived from two other transistors connected in circuit with the first transistor, one of the two transistors providing output signals of one polarity and the other of the two transistors providing output signals of opposite polarity.

Still another object is to provide a transistorized repeater as described, wherein the two transistors are arranged so that each of the transistors is alternately conductive for producing output signals of different polarity, with one of the two transistors rendering the other transistor nonconductive.

A further object is to provide a transistorized repeater as described wherein the polarity of the polar output signals is opposite in polarity from the polar input signals.

Another object is to provide an all electronic repeater for polar signals which employs no electromagnetic relays, which can be fabricated at lower cost than polar repeaters employing high quality relays, which requires substantially no servicing and maintenance attention in operation, and which operates at higher speeds and with greater reliability than polar repeaters employing relays.

The invention will be best understood from the following detailed description taken together with the drawing, wherein.

Figure 1:
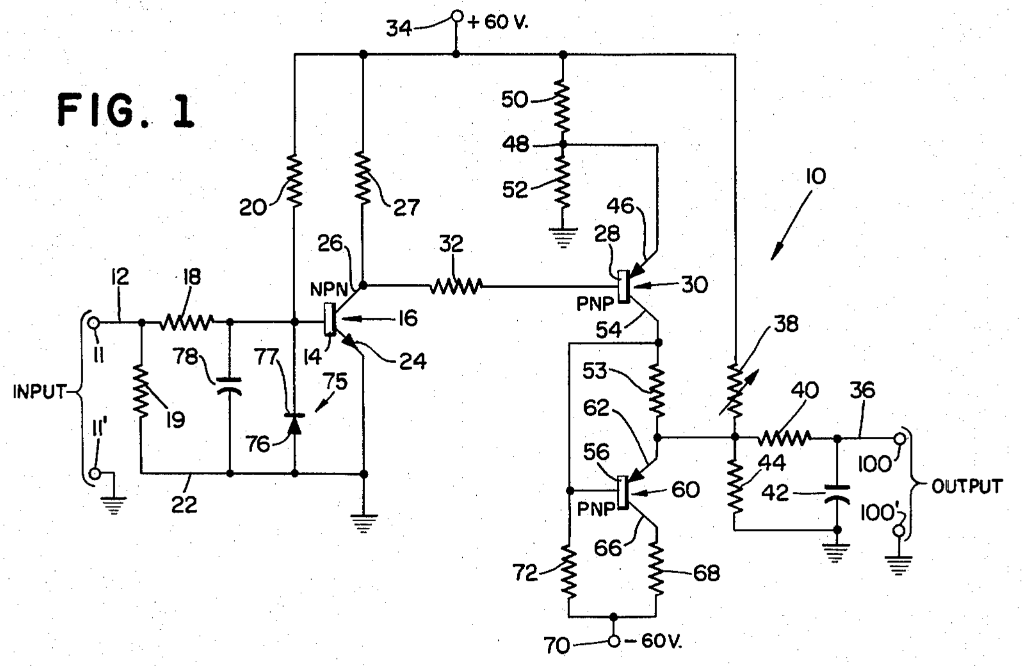
FIG. 1 is a schematic diagram of a polar signal repeating circuit embodying the invention.

Referring first to FIG. 1, there is shown circuit 10 including a low voltage input line 12 and input terminals 11, 11′. Terminal 11′ is grounded. This voltage may be of the order of six or twelve volts. The input line is connected to the base 14 of a transistor 16 via a resistor 18. A resistor 19 is connected between the input line and ground wire 22. The emitter 24 of the transistor 16 is grounded. The collector 26 of the transistor is connected to the base 28 of another transistor 30 via resistor 32. The positive terminal 34 of a high voltage direct current source is connected to output line 36 via resistors 38 and 40. This voltage could be sixty volts or more with suitable transistors. A high frequency bypass capacitor 42 is connected between the high voltage output line and ground. The junction 41 of resistors 38 and 40 is grounded via resistor 44. Collector 26 is also connected to high voltage terminal 34 via resistor 27. Base 14 is connected to terminal 34 via resistor 20. The circuit has output terminals 100, 100′. Terminal 100′ is grounded.

Emitter 46 of transistor 30 is connected to junction 48 between resistors 50 and 52. Resistor 52 is connected to ground. Resistor 50 is connected to the high voltage terminal 34. The collector 54 of transistor 30 is connected directly to the base 56 of a further transistor 60, and is connected to emitter 62 of transistor 60 via resistor 64. The collector 66 of transistor 60 is connected to the negative terminal 70 of the high voltage source via resistor 68. Base 56 is connected to terminal 70 via resistor 72.

A diode rectifier 75 has its input terminal 76 grounded and its output terminal 77 connected to the base 14 of transistor 16. A capacitor 78 is connected in parallel with the diode 75 between ground and the transistor base 14.

In operation of the circuit 10, suppose that twelve volts negative battery is applied to terminal 11 of input line 12 through a suitable source impedance not shown, such as 600 ohms, while input terminal 11′ is grounded. This will cause current to flow in resistor 19 to produce a low potential drop thereacross of six volts, for example. This potential then acts in a loop consisting of resistor 18 and diode 75 through which current will flow. The low negative potential across diode 75 also appears across the base-emitter junction 14, 24 of transistor 16. This potential reverse biases the transistor 16 to non-conducting condition even though the base 14 is connected to positive terminal 34 through resistor 20. This results because of the much lower resistance of resistor 18 with respect to the potential applied to it on line 12 than the resistance of resistor 20 with respect to the potential applied to it at terminal 34.

With transistor 16 nonconducting positive sixty volts is applied through resistors 27 and 32 to the base 28 of transistor 30. Transistor 30 is then nonconducting because of the positive potential supplied by the voltage divider 50, 52, so as to render emitter 46 more negative than base 28.

Transistor 60 has its collector 66 connected to negative high voltage terminal 70 via resistor 68 and its base connected to terminal 70 through resistor 72. Emitter 62 is connected through resistor 40 to the output line and through resistor 44 to ground. Base 56 is then biased in a conducting condition relative to the emitter since the base is negative and emitter is positive. Thus transistor 60 conducts and current flows from negative terminal 70 via resistor 68 and the transistor 60 to output line 36. Resistor 40 and capacitor 42 serve as a noise suppressing filter at the output line. The above description sets forth the condition of the circuit 10 whereby low negative potential is applied at the input line and high negative potential is applied to the output line.

Suppose now that the plurality of the signal applied at input line 12 becomes positive. Positive potential will appear at the base 14 of transistor 16 relative to emitter 24. Current will now be conducted by the base-emitter junction of transistor 16 while diode 75 will not conduct current. When transistor 16 conducts current the potential at its collector 26 is lowered to near ground potential. Current flows from the positive terminal 34 through resistor 50 and the emitter base junction of transistor 30. From transistor 30 a small part of the current flows through resistor 32 and transistor 16 to ground. A substantial current flows from positive terminal 34 through transistor 30 and resistor 53 to the output line 36 and then to ground. The small input voltage at line 12 thus results in a larger voltage at output line 36.

When current passes through resistor 53, a potential drop occurs, which renders the base 56 of transistor 60 positive with respect to its emitter because of the low impedance of resistor 50 and transistor 30 relative to resistor 72. Transistor 60 will be back-biased by this potential drop and will be rendered non-conductive when transistor 30 conducts. Transistor 60 will become conductive again only when transistor 30 ceases conduction under control of transistor 16. The circuit thus operates so that a polar output is derived in response to a polar input signal. The input signal controls transistor 16 which in turn controls transmission of positive current to the output line by transistor 30. When transistor 30 is rendered non-conductive transistor 60 is enabled to transmit negative current to the output line.

Resistor 20 holds the circuit on positive polarity should the imput line become open. Resistor 44 provides a path to ground if the output line should become opened, which develops a potential across resistor 53 sufficient to block transistor 60 when transistor 30 is conducting. Resistor 38 serves to draw current from the positive battery terminal to compensate for current drawn from the negative battery terminal which reaches the output line through resistors 72 and 53. When transistor 30 is conducting the potential across resistor 72 is higher than the potential at terminal 34 since there is also added the potential of the output line. Since the potential of the output line depends upon line resistance and this varies for different lines, resistor 38 should be adjustable so that any particular line can be set for no-bias operation.

The circuit action of transistors 16, 30 and 60 may be summarized as follows. Transistor 30 renders transistor 60 nonconductive when transistor 30 is conducting, but transistor 60 does not render transistor 30 nonconductive when transistor 60 is conducting. It is transistor 16 which renders transistor 30 nonconductive when transistor 60 is conducting. Thus when transistor 16 turns off transistor 30, transistor 60 comes on automatically due to the current passing through resistor 72. When transistor 16 turns transistor 30 on transistor 60 is turned off by the potential drop across resistor 53 due to the current passing through transistor 30.

Figure 3:
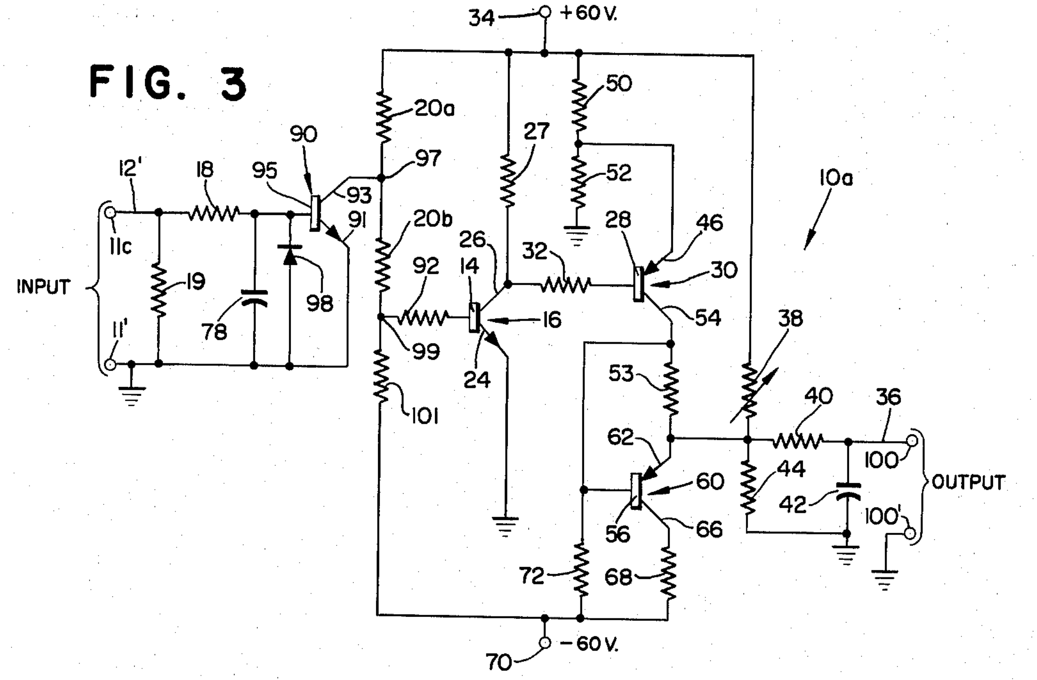
FIG. 3 is a schematic diagram of a polar signal repeating circuit similar to FIG. 1, but adapted for inverting polarity of signals between input and output.

Repeater circuit 10 effects amplification of polar input signals without inversion. In some applications, inversion of the polarity of polar input signals is desired between input and output lines. This inversion can be accomplished in a repeater circuit 10*a* as shown in FIG. 3. This circuit is similar to circuit 10 and corresponding parts are identically numbered and operate in the same manner.

The polar signal input is applied between input terminal 11*c* of line 12′ and grounded terminal 11′. Resistor 18 is connected to base 95 of another transistor 90. The emitter 91 of the transistor is grounded. The collector 93 is connected to junction point 97 between resistors 20*a* and 20*b*. Resistor 92 is connected at one end to the junction 99 between resistors 20*b* and 101. The other end of resistor 92 is connected to base 14 of transistor 16. Diode 98 is connected between base 95 and emitter 91. Capacitor 78 is connected between base 14 and ground. Resistor 19 is connected between input line 12′ and ground.

When polar signals of low voltage or current are applied at terminals 11*c*, 11′, polar signals of high voltage or current of opposite polarity appear at output terminals 100, 100′. The high voltage or current output is taken off between output line 36 and grounded output terminal 100′. The transistors 30 and 60 are alternately conductive and nonconductive in the same manner as described for circuit 10.

Inversion of polarity of the polar input signals is effected as follows: Resistors 20*a* and 20*b* are connected in series between the positive and negative power supply terminals 34, 70. The total resistance of resistor 20*a* plus resistor 20*b* is smaller than the resistance of resistor 101 so that point 99 is electrically closer to the positive end of circuit 20*a*, 20*b*, 93 than to the negative end. When transistor 90 draws no current point 99 is electrically positive. When transistor 90 is conducting, point 97 located between resistors 20*a*, 20*b* is brought close to ground potential. Then point 99 which is located on a voltage divider circuit between negative terminal 70 and ground becomes electrically negative. If positive potential is applied at 11*c*, negative potential is applied at base 14 of transistor 16 and vice versa. Then the remainder of the circuit 10*a* operates like circuit 10 described above and amplified negative potential appears at terminal 100 of output line 36.

Figure 2:
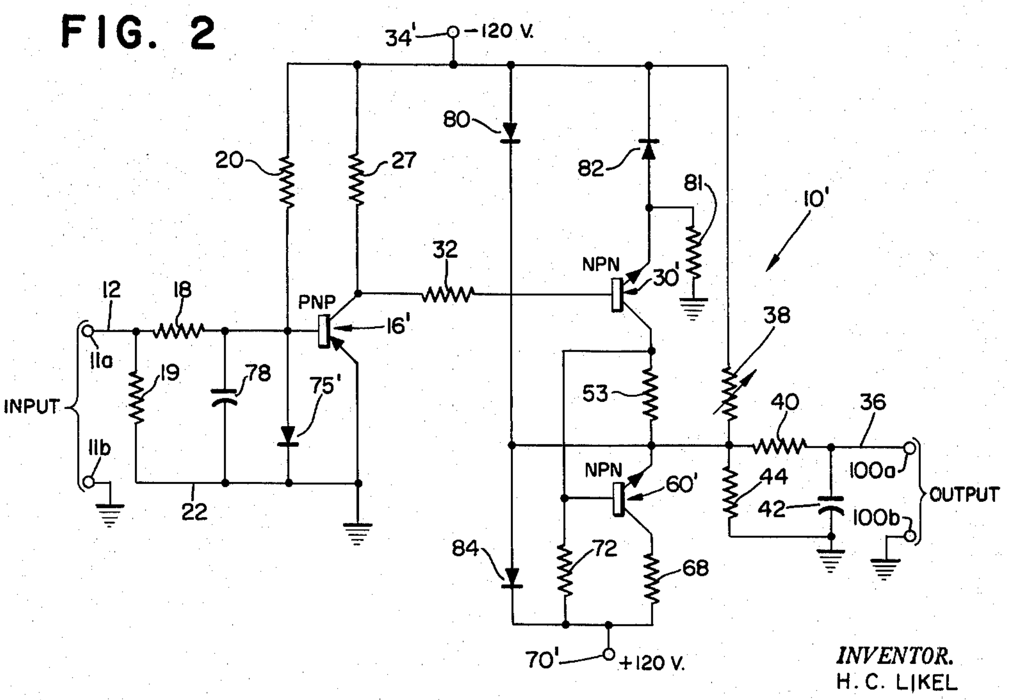
FIG. 2 is a schematic diagram of another polar signal repeating circuit according to the invention.

FIG. 2 illustrates a non-inverting polar signal repeating amplifier circuit 10′ especially adapted for operation with somewhat higher voltages than can be handled by the transistors now generally commercially available for circuit 10. Components corresponding to those of circuit 10 are identically numbered. Circuit 10′ employs output signal producing transistors 30′ and 60′ of the NPN type which are at present more readily obtainable for high voltage operation than transistors of PNP type. Resistor 50 of circuit 10 is replaced in circuit 10′ by diode 82. This diode insures that sufficient back bias will be generated to hold transistor 30′ nonconductive when at the instant when transistor 60 is rendered nonconductive with only a small current in grounded resistor 81. A further advantage derived is that the voltage drop or potential lost across diode 82 when transistor 30′ is conducting will be smaller than if diode 82 were replaced by a resistor. Additional diodes 80 and 84 are connected in the output side of circuit 10′ between transistors 30′, 60′ and the power supply output terminals 34′ and 70′ of the high voltage power supply. These diodes are so poled that they suppress high voltage surges which might result from operation of the circuit with an inductive load at output terminals 100*a*, 100*b*. It will be noted that the terminals 34′, 70′ have opposite polarity from terminals 34, 70. This is required since transistors 30′, 60′ are of NPN type while transistors 30, 60 are of PNP type. Input transistor 16′ is of PNP type while transistor 16 is of NPN type. Diode 75′ is reversed in polarity as compared with diode 75. Circuit 10′ operates in the same manner as described above for circuit 10. Low voltage polar input signals applied at input terminals 11*a*, 11*b* result in high voltage output signals at the output terminals 100, 100′. When the input signal at the input terminals is reversed in polarity, the output signals at the output terminals are also reversed in polarity. When transistor 30′ is conducting it renders transistor 60′ nonconductive, when 30′ is nonconducting transistor 60′ is allowed to conduct. The repeater 10′ does not invert signals between input and output but this repeater may be adapted in a manner similar to that shown in FIG. 3 to effect inversion of signals.

The several repeater circuits described are capable of operating at very much higher speeds than electromagnetic relays. Since the relays operate mechanically they are limited to operation with signals reversing at low speeds. The transistorized circuits described above can reverse polarity of the outputs at very high speeds since the transistors respond electronically instantly and repeatedly to reversal of polarity of input signals without mechanical wear.

The repeater circuits described operate for long periods without requiring any maintenance attention. The circuits can be constructed at low cost, much lower than circuits employing high quality electromechanical relays for repeater purposes.

I claim:

1. An electronic amplifier for amplifying and reversing polarity of polar input signals, comprising first and second transistors each having a base, emitter and collector, two high voltage power supply terminals of opposite polarity, means connecting said transistors in series between said terminals, a pair of output signal terminals, means connecting one of the output signal terminals to one power terminal and to a junction point between the transistors, the other of the output signal terminals being connected to ground, third and fourth transistors each having a base, emitter and collector, a pair of input signal terminals for receiving said polar signals, one of the signal input terminals being grounded, a voltage divider circuit including first, second and third resistors connected in series between the high voltage power supply terminals, the total resistance of the first and second resistors being less than that of the third resistor; the first transistor having its base connected to the collector of the third transistor, its emitter connected to said one power supply terminal, and its collector connected to said one output signal terminal; the second transistor having its base connected to the collector of the first transistor, its emitter connected to the one output signal terminal and its collector connected to the other power supply terminal; the third transistor having its base connected to a first junction point between the second and third resistors, and having its emitter connected to ground; the fourth transistor having its emitter connected to the grounded signal input terminal, having its base connected to the other input signal terminal, and having its collector connected to a second junction point between the first and second resistors; whereby a high signal voltage of one polarity appears at the output signal terminals when signal voltage of opposite polarity is applied at the input terminals, and whereby the polarity of the high signal voltage at the output terminals reverses when the polarity of the low signal voltage at the input signal terminals reverses.

2. An electronic amplifier as claimed in claim 1, further comprising a diode rectifier having an input terminal connected to the grounded signal input terminal and having an output terminal connected between the other signal input terminal and the base of the fourth transistor; a fourth resistor connected across the signal input terminals, a fifth resistor connected between the other signal input terminal and the base of the fourth transistor, and a sixth resistor connected between said first junction point of the second and third resistors and the base of the third transistor; whereby the first transistor renders the second transistor nonconductive, allowing the third transistor to become conducting, and the second transistor renders the third transistor nonconductive when the second transistor is conducting.

References Cited by the Examiner

UNITED STATES PATENTS

| | | | |
|---|---|---|---|
| 2,803,703 | 8/57 | Sherwin | 178—70 |
| 2,965,833 | 12/60 | Jensen | 307—88.5 |
| 2,981,895 | 4/61 | Kock | 330—18 |
| 3,001,144 | 9/61 | Dandl | 330—18 |
| 3,015,781 | 1/62 | Eklov | 330—24 X |
| 3,063,020 | 11/62 | Horowitz | 330—12 |
| 3,114,112 | 12/63 | Cochran | 330—17 |
| 3,124,758 | 3/64 | Bellamy et al. | 330—18 |

ROY LAKE, *Primarly Examiner.*

ROBERT H. ROSE, NATHAN KAUFMAN, *Examiners.*